United States Patent

[11] 3,540,465

[72] Inventor William R. Hamilton
Western Springs, Illinois
[21] Appl. No. 737,029
[22] Filed June 14, 1968
[45] Patented Nov. 17, 1970
[73] Assignee Baron Blakeslee, Inc.
Chicago, Illinois
a corporation of Illinois

[54] APPARATUS FOR MAINTAINING FLUID LEVEL CONTROL
6 Claims, 6 Drawing Figs.
[52] U.S. Cl. .................................................... 137/263
[51] Int. Cl. ....................................................... G05d 7/06,
F16k 21/18, E03b 1/00
[50] Field of Search ............................................ 137/255,
256, 259, 262, 265, 577, 579, 263

[56] References Cited
UNITED STATES PATENTS
| | | | |
|---|---|---|---|
| 297,221 | 4/1884 | Bergen ........................ | 137/255X |
| 1,472,238 | 10/1923 | Berkey ........................ | 137/255X |
| 2,006,191 | 6/1935 | Anderson ..................... | 137/255X |

Primary Examiner—M. Cary Nelson
Assistant Examiner—Robert J. Miller
Attorneys—Ronald L. Engel, Daniel W. Vittum, Jr. and Gomer W. Walters ABSTRACT: An apparatus for maintaining a first fluid and a second fluid at predetermined levels includes a first reservoir adapted to hold the first fluid at a predetermined first level, and a second reservoir adapted to hold the second fluid at a second level lower than the first level. Fluid is periodically introduced to the first or second reservoir from a source through a conduit having a first pathway leading into the first reservoir and a second pathway leading into the second reservoir. The first pathway has an upper edge portion located at a position below the first level, and the second pathway has a lower edge portion located at the first level. When the fluid flows from the source through the conduit, it bypasses the second pathway and flows through the first pathway until the first reservoir and the conduit are each filled to the first level. Thereafter, fluid flowing through the conduit passes through the second pathway into the second reservoir, thereby maintaining the first fluid in the first reservoir at the first level.

Patented Nov. 17, 1970

INVENTOR
WILLIAM R. HAMILTON
BY
ATTY

APPARATUS FOR MAINTAINING FLUID LEVEL CONTROL

BACKGROUND OF THE INVENTION

1. Field of the Invention

This invention relates to an apparatus for controlling the level of fluid in a reservoir and is more particularly directed to techniques for controlling the levels of cleaning and coating fluids in cleaning and coating equipment.

2. Description of the Prior Art

A variety of industrial apparatus requires precise control of the level of fluids held within a closed or inaccessible piece of equipment. Such systems frequently require the storage of fluids in separate reservoirs to prevent contamination of one by the other, and the maintenance of predetermined fluid levels within each reservoir in order to insure optimum operating efficiency of the equipment. Fluid control of the foregoing type is frequently required in equipment designed to clean and coat metal articles. Such apparatus typically includes one or more reservoirs of solvent that are used to clean the parts, and a separate reservoir of a coating substance dissolved in a solvent (*i.e.*, coating fluid) that is used to coat the parts with a protective film. In order to increase efficiency and conserve solvent normally lost through evaporation, both reservoirs are generally housed in a single, closed cabinet, and cooling condensers are provided above the reservoirs to prevent wasteful solvent loss.

Equipment of the foregoing type is well known and has been described in U.S. Pat. No. 2,728,686. Although such a system offers advantages over analogous devices in which the solvent and coating fluid reservoirs are housed in separate cabinets, it exhibits certain deficiencies which limit its usefulness in practice. One of the difficulties encountered is the problem of maintaining the coating fluid at a precise level. Since articles to be coated in such equipment are generally dipped into the coating fluid, a relatively low fluid level would increase the difficulty of completely coating an article, whereas a relatively high level would tend to cause the coating fluid to splash or flow into the solvent reservoir, thereby contaminating the solvent. Further, variations in the coating fluid level must be avoided so that the concentration of the coating material therein is maintained at a proper level.

Although the solvent level in some cleaning and coating systems designed for individual treatment of articles is not critical, other types of such equipment designed for mass production techniques require maintenance of precise solvent as well as coating fluid levels. In such apparatus, a relatively low level of solvent could result in inferior cleaning action, whereas a relatively high level of solvent could result in overflow into the coating reservoir, thereby contaminating the coating fluid with dirty solvent. Although both coating and solvent fluids could be periodically added or removed from their respective reservoirs by hand, such a procedure would not maintain a constant fluid level and would require opening of the equipment cabinet, resulting in loss of solvent vapor and decreasing the overall efficiency of the cleaning and coating operation.

Accordingly, it is a primary object of the present invention to provide an apparatus for maintaining a predetermined fluid level in a reservoir.

It is another object to the present invention to provide an apparatus and method for maintaining predetermined fluid levels in separate reservoirs holding different fluids.

Yet another object of the present invention is to provide means for maintaining predetermined levels of solvent and coating fluids in a cleaning and coating process.

It is yet another related object of the present invention to provide fluid-level regulating apparatus which prevents the contamination of a solvent by a coating fluid used in a cleaning and coating machine.

SUMMARY OF THE INVENTION

In accordance with the present invention, a fluid level regulator system for a device including a fluid source and a reservoir adapted to hold a first fluid at a predetermined level comprises conduit means connected to the fluid source, first pathway means between the conduit means and the reservoir, and second pathway means operatively connected to the conduit means with the second pathway means having a terminal end portion located at a position displaced from the reservoir. The second pathway means has a lower edge portion located at the predetermined level, and the first pathway means has an upper edge portion located below the predetermined level. Thus, fluid flowing from the source through the conduit means bypasses the second pathway means and flows through the first pathway means until the fluid level in the reservoir and in the conduit means reaches the predetermined level. Thereafter, additional fluid flowing through the conduit means is diverted through the second pathway means to a position displaced from the reservoir, thereby maintaining the fluid in the reservoir at the predetermined level.

Use of the foregoing level regulator system results in a fluid-level control system remarkably more accurate, durable, and economical than analogous systems found in the prior art. As applied to cleaning and coating apparatus, the present invention permits automatic maintenance of precise fluid levels at all times, even while the equipment remains closed and unattended. Moreover, the present invention results in a system in which a variety of fluids may be used in a single enclosure without fear of spillage, waste, and contamination of one fluid by another.

DESCRIPTION OF THE DRAWINGS

The above-mentioned objects, advantages, and features of the present invention will hereinafter appear, and, for purposes of illustration but not of limitation, exemplary embodiments are illustrated in the accompanying drawings, in which like reference characters refer to analogous parts throughout and in which:

FIG. 3 is an enlarged, fragmentary sectional view taken along line 3–3 in FIG. 2;

FIG. 4 is an enlarged, fragmentary sectional view of another embodiment of a cleaning and coating apparatus employing the present invention;

DESCRIPTION OF THE PREFERRED EMBODIMENTS

Figure 1:
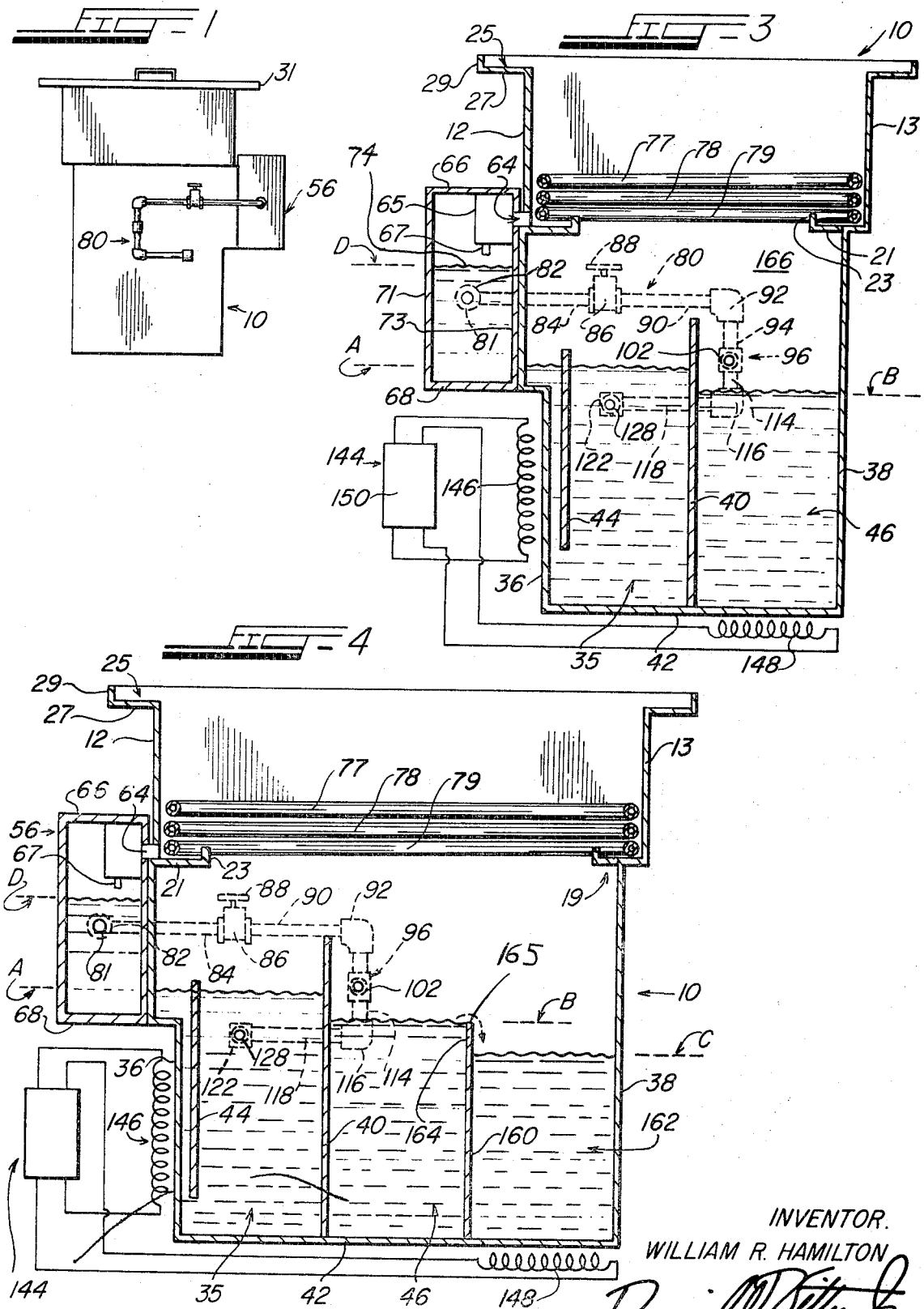
FIG. 1 is a front elevational view of a preferred form of a cleaning and coating device embodying the present invention.
Figure 2:
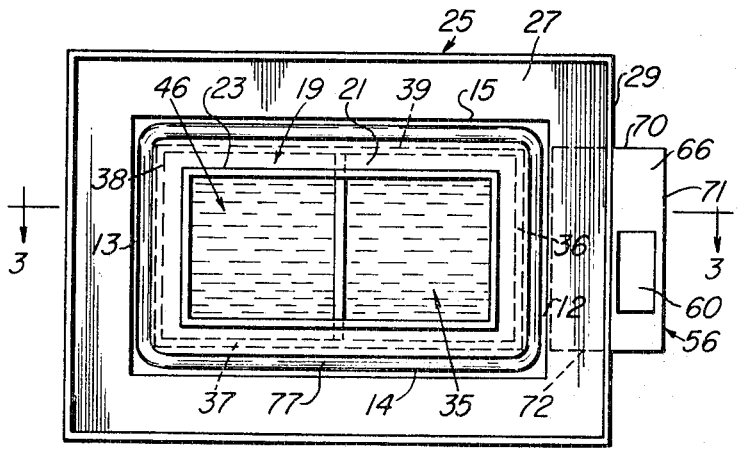
FIG. 2 is an enlarged top plan view of the apparatus shown in FIG. 1.

In its preferred aspect this invention is employed in conjunction with equipment of the vapor degreaser type. FIGS. 1–3, 5, and 6 illustrate a cabinet 10, a solvent source 56, a conduit 80, and a heating apparatus 144.

Cabinet 10 includes a series of vertically oriented upper walls 12—15 which have a horizontal trough 19 affixed at the bottom portion thereof. The trough includes a bottom plate 21 and a lip 23 that is designed to contain fluid in a manner described hereafter. A tray 25 is affixed at the top portion of the upper walls and includes a horizontal plate 27 and an upturned lip 29, both of which extend around the perimeter of the cabinet. A top 31 is designed to fit snugly over lip 29 in order to retain solvent vapors inside the cabinet.

Cabinet 10 also includes a reservoir 35 which is defined by a portion of side walls 36, 37, and 39, a panel 40, and a portion of a bottom panel 42. Reservoir 35 also includes a baffle 44 which is used to shield the contents of the reservoir from a heater coil in a manner described hereafter. Cabinet 10 also includes a reservoir 46 defined by a portion of side walls 37—39, panel 40, and a portion of bottom panel 42.

Side walls 36—39 may be integrally formed with the corresponding upper walls of the cabinet, and panel 40 may be affixed inside the cabinet by any means so long as it forms a fluidtight seal with side walls 37, 39 and bottom panel 42.

Cabinet 10 should be made from a substance adapted for use in connection with the particular fluids contained therein. When cleaning and coating fluids are held in the cabinet, it is preferably fabricated from 12 gauge stainless steel with the various parts thereof being welded together.

In the preferred embodiment of the invention described herein, reservoir 46 is designed to hold a fluid such as a cleaning solvent at a level indicated by the dotted line labeled B in FIG. 3, and reservoir 35 is designed to hold a coating composition comprising a coating material dissolved in a solvent at a level identified by the dotted line labeled A in FIG. 3. In the preferred embodiment, the solvent held in reservoir 46 and the solvent used in the preparation of the coating composition held in reservoir 35 are the same.

Solvent source 56 comprises a top panel 66, a bottom panel 68, and side panels 70—73. Solvent is supplied to the source by cooling coils 77—79 that are designed to condense vapors rising from the fluids held in the reservoirs. The condensed vapors accumulate in trough 19 and eventually flow through an opening 64 into a water separator 65 (shown schematically in the drawing). Thereafter the condensed solvent is expelled through a discharge tube 67 into the interior of source 56 where it is stored. As shown in FIG. 3, solvent denoted by the numeral 74 is generally maintained at a level identified by the dotted line labeled D. Additional solvent may be added as required through a door 60 located in top panel 66.

Conduit 80 comprises a horizontal pipe 81 that is connected through a seal 83 to source 56. As best seen in FIG. 3, pipe 81 has an opening 81' that is placed substantially below level D of the source 56 to facilitate the flow of solvent from the source. Pipe 81 is connected through a 90° elbow 82 to a horizontal pipe 84 that is, in turn, connected to a regulating valve 86. Valve 86 is operated by a knob 88 and is used to regulate the flow of solvent through the conduit in a manner described hereafter. Regulating valve 86 is connected via a horizontal pipe 90, a 90° elbow 92, and a vertical pipe 94 to a T-shaped fixture 96.

Figure 5:
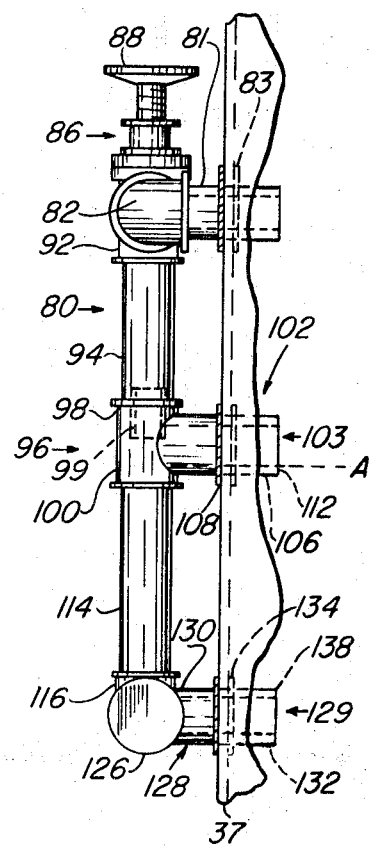
FIG. 5 is an enlarged, fragmentary, right-side elevational view of the apparatus shown in FIG. 1.
Figure 6:
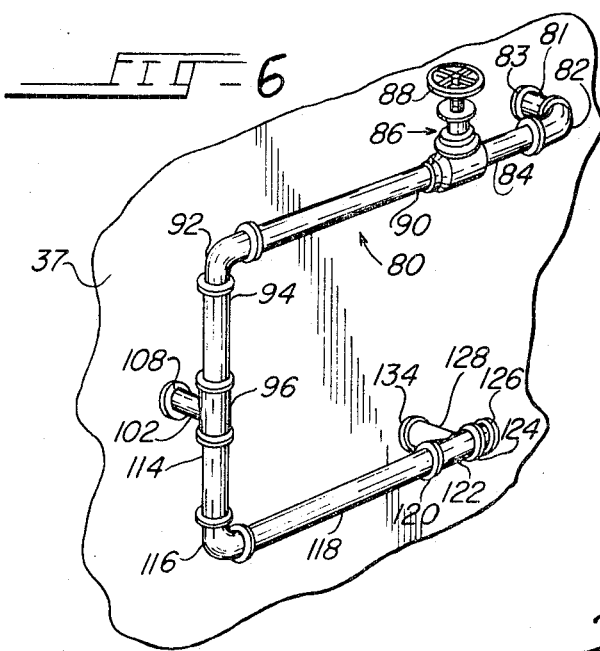
FIG. 6 is a fragmentary perspective view of the apparatus shown in FIG. 5.

As best seen in FIG. 5, fixture 96 comprises a vertical upper section 98 connected to pipe 94, a vertical lower section 100, and a horizontal tube 102. A tube 99 is threaded into the interior of the lower end of pipe 94 for a purpose that will hereinafter appear. Tube 102, in turn, has a terminal end portion 106 that is positioned through an opening in side wall 37 of reservoir 46 and is attached thereto by a suitable seal 108. Tube 102 defines a pathway 103 that includes a lower edge portion 112 positioned at level A, through which solvent may flow as hereinafter described.

The lower section 100 of fixture 96 is connected through a vertical pipe 114 and a 90° elbow 116 to a horizontal pipe 118. Pipe 118 is, in turn, connected to a first section 120 of a T-shaped fixture 122. Fixture 122 also comprises a second section 124 that is closed by a plug 126, and a horizontal tube 128 that extends through side wall 37 of reservoir 35 and is attached thereto by a seal 134. Tube 128 has a first end 130 located outside reservoir 35 and a second end 132 located inside thereof. Tube 128 forms a pathway 129 that has an upper edge portion 138 located below level A, and, as described in more detail later, the pathway serves as a path through which solvent periodically flows.

Heating apparatus 144, shown schematically in FIG. 3, includes a pair of coils 146 and 148 that are located adjacent reservoirs 35 and 46, respectively, and are connected to a suitable source of electrical power 150.

With regard to the embodiment of FIG. 4, the elements shown therein have structures and functions comparable to like-numbered elements shown in the embodiment of FIGS. 1—3, 5, and 6. Those skilled in the art will recognize that some parts shown in FIG. 4 are larger than corresponding parts shown in FIG. 3 in order to accommodate an additional solvent reservoir 162, defined by a portion of side walls 37—39, a portion of bottom panel 42, and a separator wall 160 located adjacent reservoir 46.

Separator wall 160 is attached to side walls 37, 39 and to bottom panel 42 to form a fluidtight seal between reservoirs 46 and 162, and includes a rim member 164 having an upper edge portion 165 located at the level identified by the letter B in FIG. 4. Although the relative size of some of the remaining elements forming the apparatus shown in FIG. 4 is somewhat larger than the size of corresponding elements shown in FIG. 3, the relationship of the parts is the same and can be readily understood with reference to the foregoing description of the embodiment shown in FIGS. 1—3, 5, and 6.

In order to provide a background for better understanding the purposes and scope of the present invention, a typical operating procedure used in connection with the apparatus shown in FIGS. 1—3, 5, and 6 will now be described. In such apparatus, a cleaning solvent consisting of a suitable halocarbon solvent, such as methylene chloride ($CH_2Cl_2$), is poured into reservoir 46 to level B and is poured into source 56 to approximately level D. Heat is applied to the cleaning solvent in reservoir 46 until it begins to boil, thereby creating a vapor zone 166 in the upper section of the cabinet extending from the surface of the solvent in reservoir 46 to coils 77—79. As the solvent is vaporized through the heating action of coil 148, the vapors extending above zone 166 are condensed by coils 77—79 and are collected in trough 19. Thereafter, the condensed solvent drains through opening 64 and separator 65 into source 56. Although condensation from the coils is generally sufficient to maintain solvent in the source at level D, an operator may add additional solvent as needed through door 60 in top panel 66 or directly into reservoir 46 through the open top of cabinet 10. It should be understood that the condensing coils (which may circulate refrigerant or merely cool water) need not be used in order to obtain the advantages of the present invention, although increased economy of operation is achieved thereby.

In the apparatus described herein, reservoir 35 is filled with a coating composition comprising a suitable coating substance, such as a polymeric resin, dissolved in a solvent, and the same solvent is used in reservoir 46. The coating solvent is then boiled by the application of heat from coil 146. The amount of energy given off by coil 146 is generally not critical since baffle 44 protects the coating fluid from excessive heat.

Cleaning is accomplished by lowering an article through vapor zone 166 into reservoir 46 wherein the boiling cleaning fluid quickly removes all contamination. If desired, a hand spray adapted to direct a pressurized jet of solvent may be employed as an adjunct to reservoir 46. Coating is achieved by removing the article from reservoir 46 and dipping it into the boiling coating composition contained in reservoir 35. After a suitable period of time, the article is removed, and the solvent evaporates therefrom leaving a coating that protects all surfaces.

In a process of the foregoing type, maintenance of a constant fluid level in reservoir 35 is essential to the proper treatment of an article, especially where a predetermined concentration level of dissolved coating composition in the solvent bath must be maintained for proper coating. Also, heat is rapidly applied to reservoir 35 through coil 146, so that the coating solution is at or near its boiling point, which facilitates the coating operation. The evaporation of solvent from reservoir 35 induced by this application of heat also serves to prevent any contamination of the cleaning solvent in reservoir 46 with the coating composition from reservoir 35 by acting to rapidly lower the level of fluid therein, and in order to restore the lost solvent and maintain the coating fluid at a predetermined level (i.e., level A), conduit 80 selectively admits solvent from source 56 to reservoir 35 in a manner described as follows.

Conduit 80 is designed to maintain the solvent in reservoir 35 at a predetermined level that can be controlled by the relative placement of tubes 102 and 128. For example, in order to maintain the coating composition in reservoir 35 at level A, lower edge portion 112 of tube 102 is placed at level A, whereas upper edge portion 138 of tube 128 is placed below level A. Since fluid in reservoir 35 and in conduit 80 tends to remain in equilibrium, the fluid level in conduit 80 is coincident with lower edge portion 112 of tube 102 when the coating fluid in reservoir 35 is at level A. Under such conditions, solvent flowing from source 56 is not added to reservoir 35 (since the presence of fluid below edge portion 112 in both conduit 80 and tube 128 prevents the passage of additional fluid). Instead, additional solvent is diverted along the path of least resistance and flows through tube 102 into reservoir 46, thus maintaining the solvent in reservoir 35 at level A.

If the coating fluid in reservoir 35 recedes below level A, the level of fluid in conduit 80 recedes a like amount (since the level of fluid in reservoir 35 and the lower portion of conduit 80 tends to remain in equilibrium). Under such conditions, solvent flowing from source 56 bypasses tube 102 and flows through pipe 118 and tube 128 into reservoir 35 until the coating fluid is again raised to level A.

The novel manner in which tube 99 extends into the hollow interior of fixture 96 facilitates the passage of solvent around tube 102 and into tube 128 when the fluid level in reservoir 35 (and conduit 80) is below level A (i.e., it thereby prevents solvent from tending to inadvertently flow into tube 102, rather than bypassing it and flowing through the lower portion of conduit 80 and tube 128). Persons skilled in the art will appreciate that a variety of analogous modifications will produce the same results described herein. For example, an end of tube 102 could project into the hollow interior of fixture 96. Alternatively, tube 102 could be designed so that end 106 would be higher its other end, and in addition, the opening in the other end could be substantially smaller. Other modifications of the embodiment shown herein will also be apparent to those skilled in the art. For example, tube 102 could be arranged so that its end portions would be relatively lower than its midsection. In such a tube, the lower edge portion of the midsection would be placed at level A in order to provide a pathway suitable for maintaining the fluid in reservoir 35 at level A. As long as the highest point in the lower edge portion of pathway 103 (i.e., the pathway defined by tube 102) is no higher than level A, the pathway will tend to maintain the coating fluid at level A. Likewise, tube 128 could be fabricated in a variety of suitable shapes. As long as the upper edge portion of pathway 129 (i.e., the pathway formed by tube 128) and the portion of conduit 80 below pathway 103 (i.e., tube 128, fixture 122, pipe 118, elbow 116, pipe 114 and section 100 of fixture 96) is located below level A, the particular shape of the parts is not critical In additional, it should be noted that the pathways normally created by tubes 102 and 128 could be provided by merely placing conduit 80 inside the reservoirs and boring holes in the conduit at appropriate positions.

Valve 86 is normally maintained in its fully opened position. All of the condensed solvent is returned to the system, with the solvent in reservoir 35 being maintained at a constant level due to the operation of conduit 80 and tubes 102 and 128. Over time, the level of solvent in reservoir 46 diminishes and is restored through the addition of fresh solvent. Valve 86 is closed, thereby shutting off the flow of solvent to the system, when it is desired to inactivate the device for maintenance purposes.

The operation of the embodiment shown in FIG. 4 is nearly identical to the operation of the embodiment shown in FIGS. 1—3, 5, and 6, except that reservoir 162 provides an additional means for regulating the level of cleaning fluid in reservoir 46. In the embodiment shown in FIG. 4, reservoirs 46 and 162, and source 56, are filled with identical cleaning solvents (generally halocarbon solvents), and reservoir 35 is filled with the same coating composition described in connection with FIG. 3. When the level of solvent in reservoir 46 rises to level B, the solvent spills over rim portion 164 of separator wall 160 into reservoir 162, thereby maintaining the solvent in reservoir 46 at a level not exceeding level B. The solvent in reservoir 35 of FIG. 4 is maintained at level A in the same manner described in connection with the solvent in reservoir 35 of FIG. 3. Level B, of course, must be lower than level A in order for conduit 80 to operate in the manner described.

The apparatus described in FIG. 4 has a number of advantages. Since the fluid in reservoir 35 is always maintained at level A, there is always a coating composition of sufficient depth to completely cover articles dipped therein. Moreover, since cleaning solvent periodically overflows separator wall 160, the cleaning solvent in reservoir 46 is maintained at level B, and any floating debris resulting from cleaning of a part prior to coating may be periodically transferred to reservoir 162, from where it can be conveniently collected. As a result, the levels of fluid in the coating reservoir (i.e., reservoir 35) and the cleaning reservoir (i.e., reservoir 46) remain relatively constant, and fluid level fluctuation is limited to reservoir 162, an area in which the solvent level is generally not critical.

While the apparatus and method of the present invention have been particularly described with reference to the maintenance of fluid levels in cleaning and coating devices, it will be obvious to those skilled in the art that the subject invention may advantageously be employed in other systems in which fluid levels in reservoirs must be simply, yet reliably regulated.

It should be further understood that the embodiments described are merely exemplary of the preferred practices of the present invention and various changes, modifications, and variations may be made in the arrangements, operations, and details of construction of the foregoing disclosure, without departing from the spirit and the scope of the present invention.

I claim:

1. In a device including a fluid source and a reservoir adapted to hold fluid, an improved fluid level regulator adapted to maintain fluid in the reservoir at a predetermined level comprising, in combination:
   conduit means connected to the fluid source;
   first fluid pathway means interconnecting the conduit means and the reservoir and including a fluid inlet communicating with the reservoir, with the fluid inlet having an upper edge portion positioned below the predetermined level;
   second fluid pathway means connected to the conduit means and terminating in a fluid outlet, with the fluid outlet having a lower edge portion positioned at the predetermined level;
   means for returning fluid from at least the fluid outlet to the fluid source; and
   whereby fluid flowing from the fluid source generally flows through the first fluid pathway means and the inlet into the reservoir whenever the level of fluid in the reservoir is below the predetermined level and flows through the second fluid pathway means and the fluid outlet whenever the level of fluid in the reservoir at least equals the predetermined level.

2. A combination, as claimed in claim 1, and further comprising regulating means for the conduit means, whereby the rate of fluid flow through the conduit means may be adjusted.

3. A combination, as claimed in claim 1, wherein the fluid source is located above the predetermined level such that fluid may flow through the conduit means by gravity.

4. In a device including a fluid source, a first reservoir adapted to hold fluid at a predetermined first level, and a second reservoir adapted to hold fluid at a second level below the predetermined first level, an improved fluid level regulator comprising in combination:
   conduit means connected to the fluid source;
   first fluid pathway means interconnecting the conduit means and the first reservoir and including a fluid inlet communicating with the first reservoir, with the fluid inlet having an upper edge portion positioned below the predetermined first level;

second fluid pathway means interconnecting the conduit means and the second reservoir and including a fluid outlet communicating with the second reservoir, the fluid outlet having a lower edge portion positioned at the predetermined first level; and means for returning fluid from the first and second reservoirs to the fluid source, whereby fluid flowing from the fluid source generally bypasses the second fluid pathway means and flows through the first fluid pathway means and the fluid inlet into the first reservoir whenever the level of fluid in the first reservoir is below the predetermined first level and flows through the second fluid pathway means and the fluid outlet into the second reservoir whenever the level of fluid in the first reservoir at least equals the predetermined first level.

5. A combination, as claimed in claim 4, and further comprising overflow means operatively associated with the second reservoir, whereby the fluid in the second reservoir is maintained at a level not exceeding a predetermined second level below the predetermined first level.

6. A combination, as claimed in claim 5, wherein the overflow means comprises a third reservoir separated from the second reservoir by separator means having an upper edge portion positioned at the predetermined second level.